(12) United States Patent
Schofield

(10) Patent No.: US 6,561,657 B1
(45) Date of Patent: May 13, 2003

(54) CREDIT CARD POCKET MIRROR AND MINIATURE BILLBOARD

(76) Inventor: Douglas P. Schofield, 110 Milbourn St., Rochester, NY (US) 14607

( * ) Notice: Subject to any disclaimer, the term of this patent is extended or adjusted under 35 U.S.C. 154(b) by 11 days.

(21) Appl. No.: 09/703,028

(22) Filed: Sep. 29, 2000

Related U.S. Application Data

(63) Continuation-in-part of application No. 08/807,828, filed on Feb. 27, 1997, now Pat. No. 6,142,640.

(51) Int. Cl.7 .......................... G02B 5/08; G02B 7/182; G09F 1/00
(52) U.S. Cl. ................. 359/838; 359/870; 359/871; 359/883; 428/412; 428/457; 428/458; 428/912.2; 428/913.3; 283/56; 283/904; 40/124.01; 40/124.191
(58) Field of Search ..................... 359/838, 870, 359/871, 883, 884; 428/412, 457, 458, 912.2, 913.3; 283/56, 904; 40/124.01, 124.191

(56) References Cited

U.S. PATENT DOCUMENTS

| 809,698 | A | * | 1/1906 | Kelley |
| 1,454,678 | A | | 5/1923 | Krueger |
| 2,647,441 | A | | 8/1953 | Boydston et al. |
| 3,912,842 | A | * | 10/1975 | Swartz |
| 4,605,292 | A | * | 8/1986 | McIntosh |
| 4,889,419 | A | * | 12/1989 | Kite |
| 4,897,533 | A | * | 1/1990 | Lyszczarz |
| 6,142,640 | A | * | 11/2000 | Schofield |

* cited by examiner

*Primary Examiner*—Ricky D. Shafer
(74) *Attorney, Agent, or Firm*—Stephen B. Salai, Esq.; Brian B. Shaw, Esq.; Harter, Secrest & Emery LLP

(57) ABSTRACT

A flat flexible and imperforate mirror which is conveniently designed and sized to fit anywhere a credit card can be stored is disclosed. The mirror has a substantially flat rectangular body, a front reflective layer and rounded edges. An indicia bearing layer is applied to the opposite side of the body from the reflective layer.

6 Claims, 1 Drawing Sheet

CREDIT CARD POCKET MIRROR AND MINIATURE BILLBOARD

This application is a continuation-in-part of Ser. No. 08/807,828 filed Feb. 27, 1997, now U.S. Pat. No. 6,142,640.

BACKGROUND OF THE INVENTION

The present invention relates in general to a flat, flexible, imperforate mirror that can be conveniently carried in a credit card pocket of a man or a woman's wallet, while providing maximum advertising space on one surface for an advertiser, maximum mirror viewing space on an opposite surface for the man or woman. The mirror is constructed as a laminated assembly of equal sized layers providing ease of manufacture all of these features increase the mirror's commercial value.

FIELD OF THE INVENTION

In the past, plastic mirrors have been disclosed in the art, but none have been specifically designed to be stored in a credit card pocket to provide maximum advertising space for an advertiser, and maximum viewing space for the user of the mirror, and constructed for ease of manufacture.

U.S. Pat. No. 4,511,618 to Duchene discloses a layer arrangement of a mirror sheet, a mirror coating an optional waterproof layer, a layer of adhesive material, and a flat glass backing layer. Since Duchene is directed to a solar reflecting panel, Duchene would have no need for an indicia bearing area covering an entire surface of the mirror. Duchene is not sized to fit a credit card pocket.

U.S. Pat. No. 4,780,372 to Tracy discloses a layer arrangement of a paint coat, a layer of copper, a silver layer, a layer of silver nitride, and a glass substrate. Not all layers are of the same size in Tracy. Tracy does not disclose an indicia bearing layer, and is not sized to fit into a credit card pocket.

U.S. Pat. No. 5,247,395 to Martinez discloses a layer arrangement of a mirror film, a raised film support surface, and a layer of stamped or formed members. Martinez discloses applications for "washrooms, gyms, locker rooms etc." (col. 1, lines 13–14). Martinez does not disclose an indicia bearing area covering an entire surface of the mirror. Martinez' device is perforated reducing the viewing and advertising area.

U.S. Pat. No. 4,792,482 to Leach discloses a layer arrangement of an optional plastic sheet or film or cardboard protective layer, a mirror layer, a porous layer of fibrous material, and a backing layer. Leach discloses support surfaces for the mirrors as wells and the ceiling of buildings. In an environment in which the mirror is mounted to a wall or ceiling, such as in Leach, there would be no use in placing an indicia bearing layer on the backside. The layers in Leach are not equal in size, and the mirror is not sized to fit into a credit card pocket.

U.S. Pat. No. 4,889,419 to Kite discloses a layer arrangement of a mirror and a base material. Kite discloses that only a portion of a surface may be used as a place for textual material such as advertising. Kite has notches and perforations in his device further reducing viewing and advertising space.

U.S. Pat. No. 4,605,292 to McIntosh discloses a layer arrangement of non-magnetically attractive supporting surface, a layer of adhesive, a carrier strip, an adhesive coating, a magnet, an adhesive coating, and a rear surface. In McIntosh, the layers are not all equal sized. Also, in McIntosh the visible indicia is placed on a reflective surface, obstructing viewing area.

U.S. Pat. No. 3,743,389 to Stiller discloses a layer arrangement of polyvinyl chloride, mirror, and polyvinyl chloride. Stiller does disclose that the exterior of the case is imprinted with a slogan. In Stiller, the indicia layer obstructs the reflective layer, and the indicia layer is of a different size than the reflective layer.

U.S. Pat. No. 4,636,047 to Green discloses a layer arrangement of a paper layer, a remaining paper layer, an adhesive layer, metal lamina, and a chromium plating layer. The mirror accessory of Green is designed to adhere to the back of a watch, and would serve no purpose for it to have an indicia bearing layer on the opposite side. In Green, the unreflective layer and the reflective layer are not of the same size. The layer arrangement of Green is much thicker than can fit into a credit card holder.

U.S. Pat. No. 4,024,828 to Knoll discloses a protective coating, chrome plating, and a plate. Knoll has a perforated structure reducing viewing and advertising space.

U.S. Pat. No. 2,647,441 to Boydston discloses a layered arrangement of a magnesium fluoride overcoating, a metallic or other reflecting film, and glass or other mirror base. Boydston does not disclose a layer or visible indicia and is not sized to fit a credit card pocket.

U.S. Pat. No. 1,454,678 to Krueger discloses a layered arrangement of a front cover having an outer surface for the placing of a suitable advertising inscription, an intermediate supplementary, and a metallic disk. The reflector of Krueger has a hole, reducing viewing and advertising space, and the indicia layer obstructs the reflective layer.

It is therefore an object of the present invention to provide for a flat, flexible, imperforate mirror, which is conveniently designed and sized to fit anywhere a credit card can be stored. At the same time it provides an unreflective surface which will provide maximum space for advertising and reflective surface that provides maximum surface for the user of the mirror, and equally sized layers to provide ease of manufacture.

DETAILED DESCRIPTION OF THE INVENTION

Figure 1:
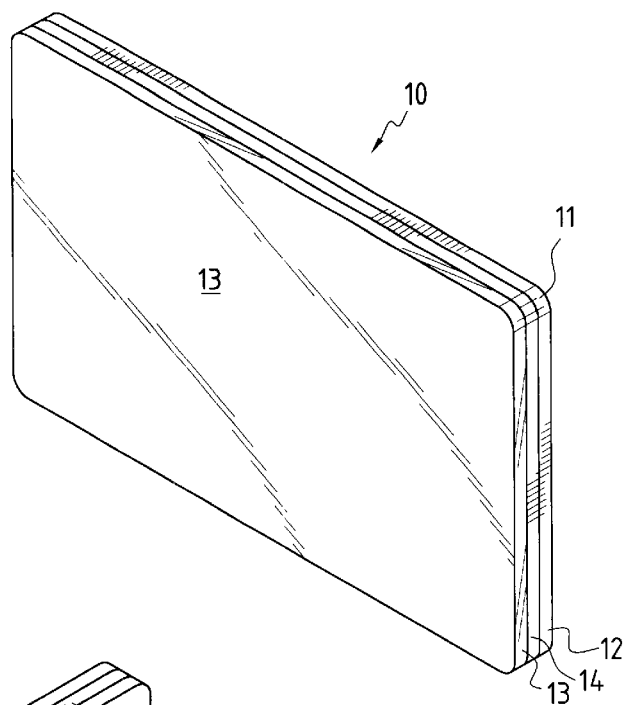
FIG. 1 is a front perspective view of the mirror of the present invention.

The present invention is illustrated by the drawings where in FIG. 1 the mirror 10 is depicted having a substantially flat, rectangular body sized to fit in a credit card pocket, and having, a front reflective layer 13, and rounded edges 11.

Figure 2:
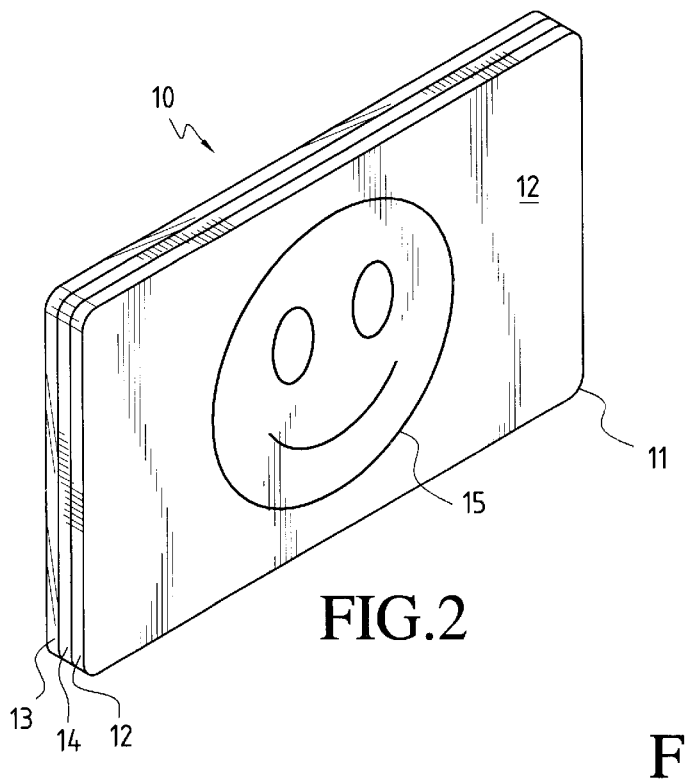
FIG. 2 is a back perspective view of the mirror of FIG. 1.
Figure 3:
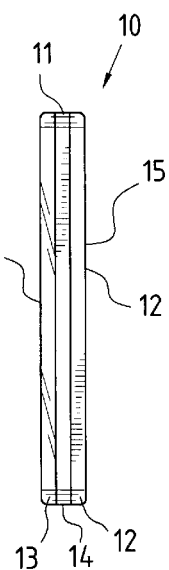
FIG. 3 is a side view of the mirror of FIG. 1.

As shown in FIG. 2, the main support layer 14 may comprise any suitably semi-flexible, substantially unbreakable material such as poly-carbonate or other suitable plastic material, paper, cardboard or wood. The main support layer 14 may be transparent or opaque and separates an advertising indicia layer 12 from the reflective layer 13.

The reflective layer 13 in FIG. 1 of the mirror 10 may comprise any suitable reflective material such as vacuum metalized aluminum, dielectric coating or mylar film, applied to the surface of the mirror, or protected by a transparent layer.

The indicia bearing layer 12 in FIG. 2 may comprise any ink or paint receptive material, and in the case of FIG. 2 illustrates a smiling face 15. Preferably layer 12 carries an advertising message.

The mirror 10 preferably has a size approximately that of a typical credit card—2⅛ inches, +/−¼ inch wide and 3⅜ inches +/−¼ inch long, and a thickness of 1/16 inches up to about ¼ inch can be used.

The mirror 10 is substantially flat and imperforate, so that the entire reflective layer 11 comprises an unobstructed reflective material. The entire indicia bearing layer is receptive and may be completely covered by advertising indicia.

The mirror of the present invention can be conveniently stored anywhere that a credit card can be stored, preferably in a wallet of the user. The rounded corners 11 prevent the wallet from being torn.

Although particular embodiments of the present invention have been disclosed herein for purposes of explanation, further modifications or variations thereof will be apparent to those skilled in the art to which this invention pertains.

What is claimed:

1. A portable mirror suitable for storage in a credit card pocket, comprising, in laminated relationship:

a flexible shatter resistant imperforate generally rectangular plastic sheet;

a layer of reflective material on a first surface of the generally rectangular plastic sheet forming a mirrored surface;

a layer of visible indicia receptive material on a second surface of the generally rectangular plastic sheet;

an advertising message on the layer of indicia receptive material;

wherein the layer of reflective material, the layer of visible indicia and the generally rectangular plastic sheet are of equal size and each of the layer of reflective material and the layer of visible indicia is substantially unobstructed so that a reflective area and an indicia bearing area each covering an entire surface of the mirror are provided;

the layer of reflective material and the layer of visible indicia being separated by at least the generally rectangular plastic sheet;

the mirror being imperforate and having a substantially continuous rectangular surface, said mirror having a thickness and size compatible for storage in a credit card pocket.

2. The mirror of claim 1 in which the layer of reflective material is imperforate.

3. The mirror of claim 1 in which the thickness of the mirror does not exceed ¼ of an inch.

4. The mirror of claim 1 in which the width is 2⅛ of an inch and the length is 3⅜ of an inch with a tolerance of +/−¼ of an inch.

5. The mirror claim 1 in which the generally rectangular plastic sheet is opaque.

6. The mirror of claim 1 in which the advertising message substantially covers the layer of indicia receptive material.

* * * * *